(12) United States Patent
Arnold et al.

(10) Patent No.: US 9,970,567 B2
(45) Date of Patent: May 15, 2018

(54) ACTUATOR APPARATUS WITH INTERNAL TUBING AND ANTI-ROTATION MECHANISM

(71) Applicant: Fisher Controls International LLC, Marshalltown, IA (US)

(72) Inventors: David Anthony Arnold, Marshalltown, IA (US); Daniel Martin Adams, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 0 days. days.

(21) Appl. No.: 15/253,275

(22) Filed: Aug. 31, 2016

(65) Prior Publication Data

US 2017/0002952 A1    Jan. 5, 2017

Related U.S. Application Data

(63) Continuation of application No. 14/189,627, filed on Feb. 25, 2014, now Pat. No. 9,458,947.

(51) Int. Cl.
*F16K 31/12* (2006.01)
*F16K 31/16* (2006.01)
(Continued)

(52) U.S. Cl.
CPC .......... *F16K 31/1226* (2013.01); *F16K 27/08* (2013.01); *F16K 31/1264* (2013.01); *F16K 31/163* (2013.01); *F16K 39/00* (2013.01)

(58) Field of Classification Search
USPC ......... 251/327, 1.3, 1.1, 326, 328; 166/54.5, 166/54.6, 385, 94.3; 83/694
See application file for complete search history.

(56) References Cited

U.S. PATENT DOCUMENTS 2,078,553 A    4/1937   Allen et al.
2,132,199 A    10/1938  Yancey
(Continued)

FOREIGN PATENT DOCUMENTS

CH      244911     10/1946
DE      1019878    3/1955
(Continued)

OTHER PUBLICATIONS

Arca Regler Gmbh, "Diaphragm Actuators," MA Brochure, [http://www.arca-valve.com/index/lang/en/artikel/1119], retrieved on Mar. 14, 2014, 6 pages.

(Continued)

*Primary Examiner* — Mary McManmon
*Assistant Examiner* — Daphne M Barry
(74) *Attorney, Agent, or Firm* — Hanley, Flight and Zimmerman, LLC

(57) ABSTRACT

Fluid valve actuator apparatus having internal tubing and anti-rotation features are disclosed. An example actuator apparatus includes a diaphragm plate defining a first pressure chamber and a second pressure chamber opposite the first pressure chamber, a first internal fluid passageway in fluid communication with atmosphere, and a second internal fluid passageway to receive a control fluid from a controller. The example apparatus also includes a tube fluidly coupling the first or second internal fluid passageway to the first pressure chamber via an opening in the diaphragm plate, where a first center axis of the tube is offset from a second center axis of the diaphragm plate, and where the tube passing through the diaphragm plate is to prevent the diaphragm plate from rotating. The example actuator apparatus also includes an adjustable spring seat in contact with a spring at a first end of the spring, where the spring is in (Continued)

contact with the diaphragm plate at a second end of the spring opposite the first end.

21 Claims, 9 Drawing Sheets

(51) Int. Cl.
*F16K 39/00* (2006.01)
*F16K 27/08* (2006.01)
*F16K 31/122* (2006.01)
*F16K 31/163* (2006.01)
*F16K 31/126* (2006.01)

(56) References Cited

U.S. PATENT DOCUMENTS

| | | |
|---|---|---|
| 2,783,746 A | 3/1957 | Boteler |
| 2,882,008 A | 4/1959 | Giaque |
| 3,206,165 A | 9/1965 | Salmon et al. |
| 3,874,629 A | 4/1975 | Fontaine |
| 3,892,384 A | 7/1975 | Myers |
| 3,934,814 A | 1/1976 | Orszak |
| 4,054,979 A | 10/1977 | Massey, Jr. |
| 4,311,297 A | 1/1982 | Barrington |
| 4,383,553 A | 5/1983 | Platt |
| 4,483,512 A | 11/1984 | Drapeau |
| 4,523,436 A | 6/1985 | Schedel et al. |
| 4,616,804 A | 10/1986 | Sano et al. |
| 4,671,490 A | 6/1987 | Kolenc et al. |
| 4,763,690 A | 8/1988 | Martin |
| 4,834,133 A | 5/1989 | LaCoste et al. |
| 4,922,952 A | 5/1990 | Kemmler |
| 5,288,052 A | 2/1994 | Black et al. |
| 5,469,774 A | 11/1995 | Kaspers |
| 5,699,664 A | 12/1997 | LeFleur |
| 5,706,856 A | 1/1998 | Lancaster |
| 5,722,638 A | 3/1998 | Miller et al. |
| 5,820,106 A | 10/1998 | Wurangian |
| 6,637,267 B2 | 10/2003 | Fiebelkorn et al. |
| 7,216,844 B2 | 5/2007 | Malina et al. |
| 8,267,372 B2 | 9/2012 | Masamura |
| 9,458,947 B2 | 10/2016 | Arnold et al. |
| 2003/0024580 A1 | 2/2003 | Bohaychuk |
| 2006/0049375 A1 | 3/2006 | Gossett |
| 2012/0012772 A1 | 1/2012 | Moore et al. |
| 2013/0193356 A1 | 8/2013 | Collison et al. |
| 2014/0014859 A1 | 1/2014 | McCarty |
| 2015/0240965 A1 | 8/2015 | Arnold et al. |

FOREIGN PATENT DOCUMENTS

| | | |
|---|---|---|
| DE | 1926781 | 11/1970 |
| DE | 9210096 | 9/1992 |
| DE | 102009008493 | 8/2010 |
| EP | 0134866 | 3/1985 |
| EP | 0277309 | 8/1988 |
| EP | 0607621 | 7/1994 |
| GB | 1236631 | 6/1971 |
| GB | 2256028 | 11/1992 |
| WO | 2010087938 | 8/2010 |

OTHER PUBLICATIONS

Arca Regler Gmbh, "OPOS—Interface," Press Release ARCA Regler GmbH, Arca Valves, accessed on Feb. 25, 2014, 1 page.

Fisher, "Fisher GX Control Valve and Actuator System," GX Control Valve and Actuator, Product Bulletin, Mar. 2012, 36 pages.
Fisher, "Fisher 657 and 667 Diaphragm Actuators," 657 and 667 Actuators, Product Bulletin, May 2012, 16 pages.
Fisher, "Type SS-114 Control Valve," Instruction Manual, Feb. 1997, 8 pages.
International Searching Authority, "Search Report," issued in connection with International Application No. PCT/US2013/023063, dated May 6, 2013, 3 pages.
International Searching Authority, "Written Opinion," issued in connection with International Application No. PCT/US2013/023063, dated May 6, 2013, 7 pages.
International Searching Authority, "International Preliminary Report on Patentability," issued in connection with International Application No. PCT/US2013/023063, dated Aug. 5, 2014, 8 pages.
International Searching Authority, "International Search Report," issued in connection with International Application No. PCT/US2013/049840, dated Oct. 28, 2013, 4 pages.
International Searching Authority, "Written Opinion," issued in connection with International Application No. PCT/US2013/049840, dated Oct. 28, 2013, 7 pages.
International Searching Authority, "International Preliminary Report on Patentability," issued in connection with International Application No. PCT/US2013/049840, dated Jan. 22, 2015, 9 pages.
International Searching Authority, "Search Report," issued in connection with PCT Application No. PCT/US2015/017415, dated Jun. 12, 2015, 5 pages.
International Searching Authority, "Written Opinion," issued in connection with PCT Application No. PCT/US2015/017415, dated Jun. 12, 2015, 4 pages.
Samson Controls Inc, "Series 3240 Global Control Valve Type 3241 (241) Pneumatic Control Valves Type 3241/3271 (241-1) and Type 3241/3277 (241-7)," Edition Jul. 1998, 16 pages.
United States Patent and Trademark Office, "Non-Final Office Action," issued in connection with U.S. Appl. No. 13/362,750, dated Feb. 5, 2014, 23 pages.
United States Patent and Trademark Office, "Final Office Action," issued in connection with U.S. Appl. No. 13/362,750, dated Jul. 28, 2014, 20 pages.
United States Patent and Trademark Office, "Non-Final Office Action," issued in connection with U.S. Appl. No. 13/362,750, dated Dec. 29, 2014, 23 pages.
United States Patent and Trademark Office, "Final Office Action," issued in connection with U.S. Appl. No. 13/362,750, dated Apr. 1, 2015, 19 pages.
United States Patent and Trademark Office, "Restriction," issued in connection with U.S. Appl. No. 13/547,761, dated Mar. 13, 2015, 10 pages.
United States Patent and Trademark Office, "Non-Final Office Action," issued in connection with U.S. Appl. No. 13/547,761, dated Aug. 19, 2015, 18 pages.
United States Patent and Trademark Office, "Notice of Allowance," issued in connection with U.S. Appl. No. 13/547,761, dated Nov. 16, 2015, 21 pages.
United States Patent and Trademark Office, "Non-Final Office Action," issued in connection with U.S. Appl. No. 14/189,627, dated Aug. 5, 2015, 30 pages.
United States Patent and Trademark Office, "Final Office Action," issued in connection with U.S. Appl. No. 14/189,627, dated Feb. 22, 2016, 29 pages.
United States Patent and Trademark Office, "Notice of Allowance," issued in connection with U.S. Appl. No. 14/189,627, dated Jun. 8, 2016, 25 pages.

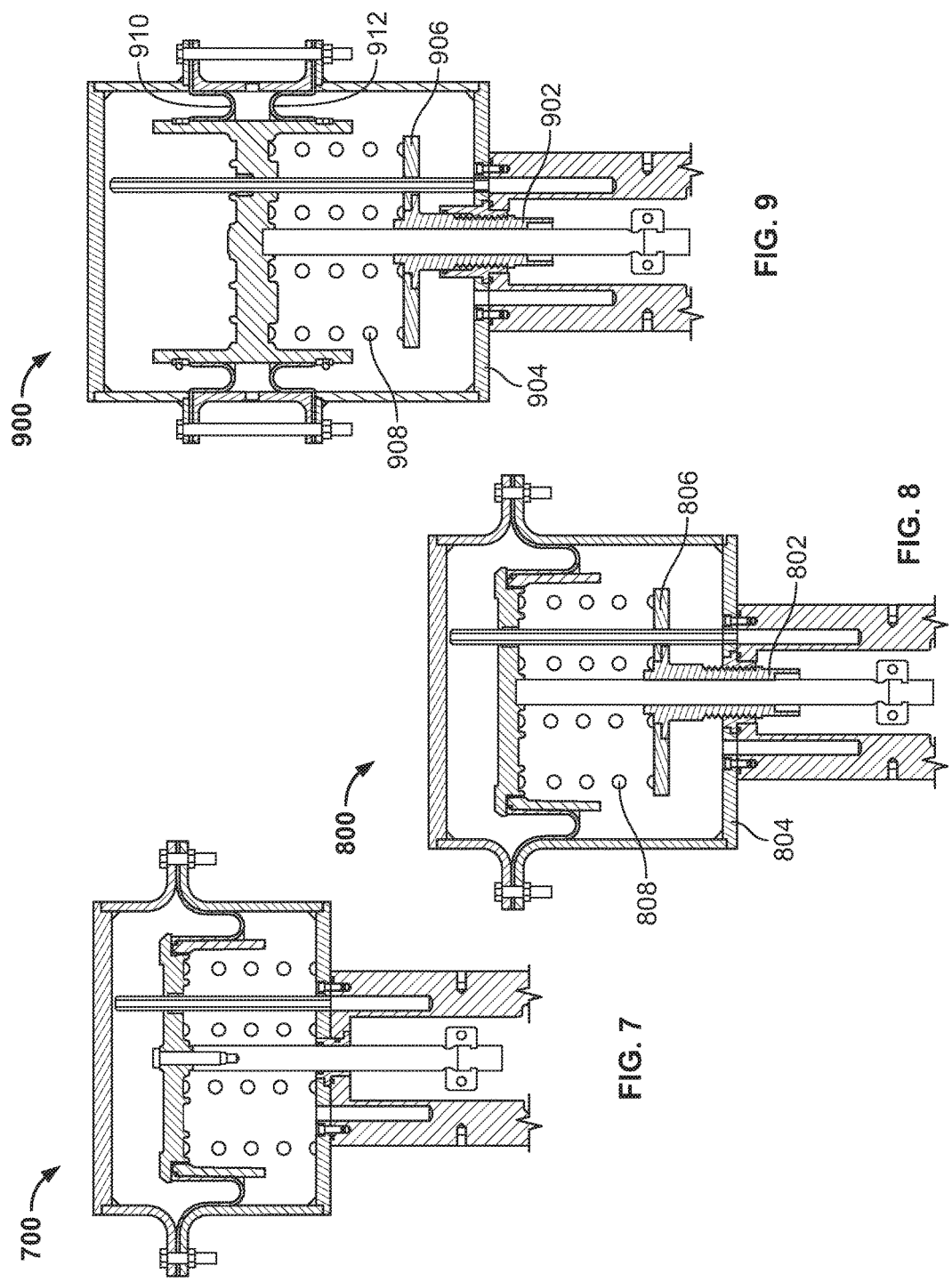

ACTUATOR APPARATUS WITH INTERNAL TUBING AND ANTI-ROTATION MECHANISM

RELATED APPLICATION

This patent arises as a continuation of U.S. patent application Ser. No. 14/189,627, entitled "ACTUATOR APPARATUS WITH INTERNAL TUBING AND ANTI-ROTATION MECHANISM," filed Feb. 25, 2014. Priority to U.S. patent application Ser. No. 14/189,627 is hereby claimed. U.S. patent application Ser. No. 14/189,627 is hereby incorporated herein by reference in its entirety.

FIELD OF THE DISCLOSURE

This patent relates generally to actuators and, more particularly, to actuator apparatus having internal tubing and anti-rotation features.

BACKGROUND

Fluid control valves are commonly used in process control systems to control the flow of process fluids. A fluid control valve assembly typically includes an actuator operatively coupled to a flow control member (e.g., a valve gate, a plug, a closure member, etc.) of a fluid valve. The actuator controls the position of the flow control member with respect to a valve seat to control or regulate fluid flow through the valve.

In operation, a controller (e.g., a positioner) is often employed to supply a control fluid (e.g., air) to a chamber of the actuator to cause movement of a load apparatus (e.g., a diaphragm) which, in turn, controls the position of the flow control member. In some examples, a yoke is employed to couple the actuator to the fluid valve. Additionally, in some instances, the controller is mounted to the yoke.

Known fluid control valves often employ external tubing to fluidly couple a control fluid between the controller and a chamber (e.g., a pressure chamber) of the actuator. However, the external tubing may become damaged or dislodged, thereby affecting the accuracy of the actuator and, thus, a desired fluid flow through the valve.

In addition, fluid flowing through a valve body can impart torsional loads on the flow control member, which can be transmitted to the actuator. These torsional loads can damage valve seating surfaces and/or internal actuator components, thereby affecting the accuracy of the actuator and, thus, a desired fluid flow through the valve.

SUMMARY

An example actuator apparatus includes a diaphragm plate defining a first pressure chamber and a second pressure chamber opposite the first pressure chamber, a first internal fluid passageway in fluid communication with atmosphere, and a second internal fluid passageway to receive a control fluid from a controller. The example apparatus also includes a tube fluidly coupling the first or second internal fluid passageway to the first pressure chamber via an opening in the diaphragm plate, where a first center axis of the tube is offset from a second center axis of the diaphragm plate, and where the tube passing through the diaphragm plate is to prevent the diaphragm plate from rotating. The example actuator apparatus also includes an adjustable spring seat in contact with a spring at a first end of the spring, where the spring is in contact with the diaphragm plate at a second end of the spring opposite the first end.

Another example apparatus includes means for actuating a fluid valve and means for attaching the means for actuating to the fluid valve. The example apparatus also includes first means for fluidly coupling a first pressure chamber of the means for actuating to atmosphere. A portion of the first means for fluidly coupling is integrally formed with the means for attaching. In addition, the example apparatus includes second means for fluidly coupling a second pressure chamber of the means for actuating to a control fluid without the use of external tubing. A portion of the second means for fluidly coupling is integrally formed with the means for attaching. In addition, the first or second means for fluidly coupling further includes means for preventing a valve stem of the fluid valve from rotating relative to the fluid valve. The example apparatus also includes adjustment means for adjusting an amount of force acting on the actuating means.

Another example apparatus includes an actuator casing, a diaphragm plate disposed within the actuator casing and defining a first pressure chamber and a second pressure chamber opposite the first pressure chamber. The example apparatus also includes a yoke to couple the actuator casing to a fluid valve, where the yoke includes a first internal fluid passageway in fluid communication with atmosphere and a second internal fluid passageway to receive a control fluid from a controller. The example apparatus also includes a tube fluidly coupling the first or second internal fluid passageway to the first pressure chamber via an opening in the diaphragm plate, where a first center axis of the tube is offset from a second center axis of the diaphragm plate, and where the tube passing through the diaphragm plate is to prevent the diaphragm plate from rotating relative to the actuator casing.

BRIEF DESCRIPTION OF THE DRAWINGS

FIG. 7 illustrates an example direct-acting actuator apparatus having a non-adjustable bench set.

FIG. 8 illustrates an example direct-acting actuator apparatus having an adjustable bench set.

FIG. 9 illustrates an example direct-acting actuator apparatus having an adjustable bench set and a double diaphragm.

DETAILED DESCRIPTION

Figure 1A:
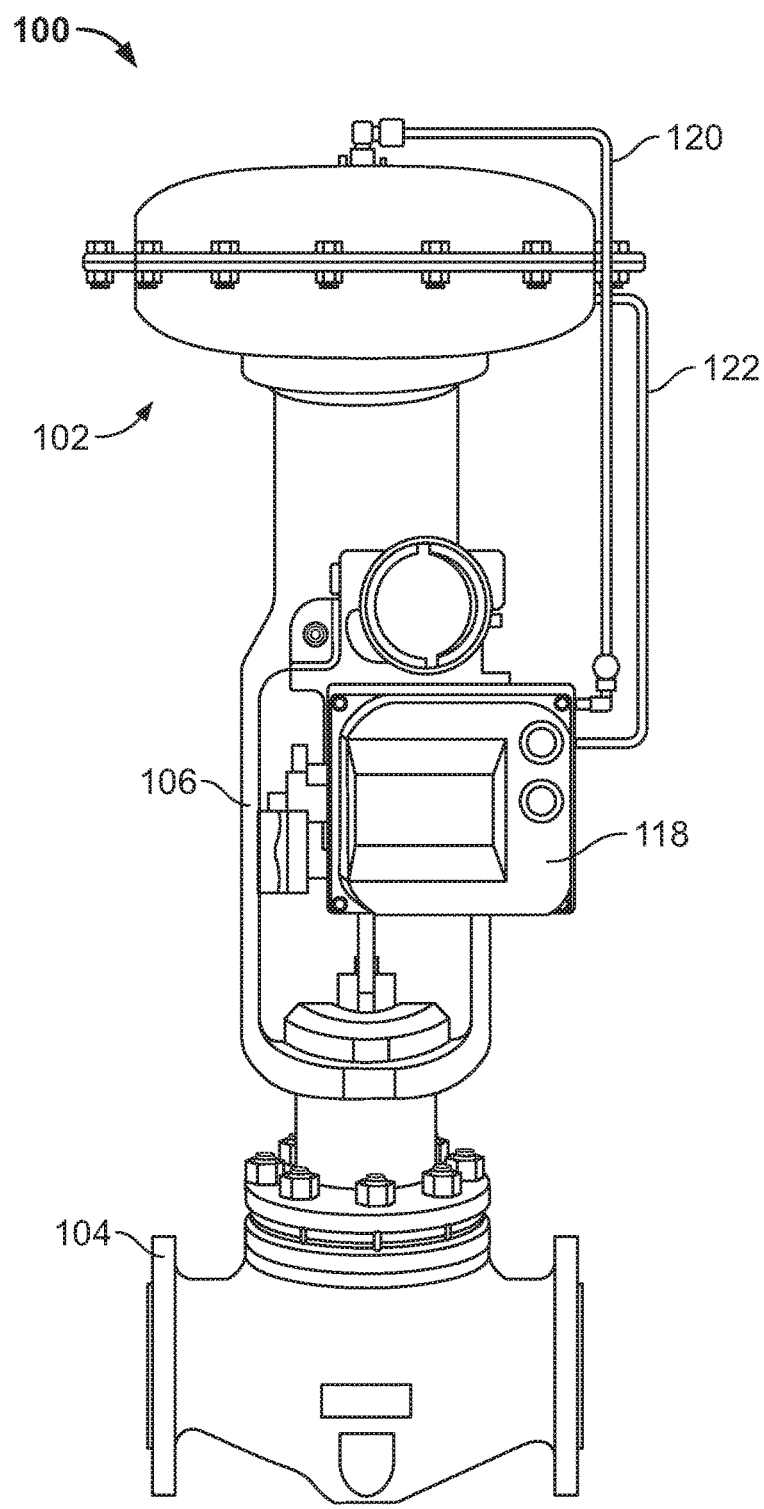
FIG. 1A illustrates a known fluid control valve assembly having external tubing.

Example actuator apparatus disclosed herein eliminate the need for external tubing to fluidly couple a control fluid supply (via, e.g., a controller or a positioner) to a chamber (e.g., a pressure chamber) of a fluid valve actuator for both direct-acting and reverse-acting actuator configurations. In addition, example actuator apparatus disclosed herein include an anti-rotation apparatus to prevent a valve stem from rotating with respect to a valve. Moreover, example apparatus disclosed herein provide venting through a yoke coupled to the actuator.

Valve actuators are typically available in direct-acting and reverse-acting configurations. In direct-acting configurations, increasing the pressure of a control fluid (e.g., air) supplied to the actuator pushes the diaphragm down, thereby extending the actuator stem. In reverse-acting configurations, increasing the pressure of a control fluid supplied to the actuator pushes the diaphragm up, thereby retracting the actuator stem. Direct-acting actuators are often referred to as air-to-close actuators because increasing air pressure to the actuator extends the actuator stem, which causes the flow control member to move towards the valve seat, thereby restricting fluid flow. However, certain actuators are configured such that extending the actuator stem causes the flow control member to move away from the valve seat, thereby enabling fluid flow. Similarly, reverse-acting actuators are often referred to as air-to-open actuators because increasing air pressure to the actuator retracts the actuator stem, which causes the flow control member to move away from the valve seat, thereby enabling fluid flow. However, certain actuators are configured such that retracting the actuator stem causes the flow control member to move towards the valve seat, thereby restricting fluid flow. For the purposes of this disclosure, example actuator apparatus are described in which direct-acting actuators are air-to-close actuators and reverse-acting actuators are air-to-open actuators. However, the present disclosure is also applicable to actuators in which direct-acting actuators are air-to-open actuators and reverse-acting actuators are air-to-close actuators. Furthermore, the control fluid employed by actuators in accordance with the present disclosure need not be air. Also, for the purposes of this disclosure, example actuator apparatus are described as diaphragm actuators. However, the present disclosure is also applicable to other types of actuator apparatus, such as piston actuators.

Example actuator apparatus disclosed herein include a yoke with internal fluid passageways. Specifically, an internal tube or tubing may fluidly couple a first pressure chamber of the actuator with one of first and second internal fluid passageways of the yoke via an opening in a diaphragm plate. In an example, the internal tubing is rigid and also prevents the diaphragm from rotating, thereby preventing the valve trim from rotating due to torsional forces imparted by fluid flowing through the valve body.

In a direct-acting (e.g., air-to-close) configuration, the internal tube or tubing is fluidly coupled to the second internal fluid passageway of the yoke to supply control fluid to the first pressure chamber. The second pressure chamber is in fluid communication with atmosphere via the first internal fluid passageway of the yoke to provide venting for the first pressure chamber.

In a reverse-acting (e.g., air-to-open) configuration, the internal tube or tubing is fluidly coupled to the first internal fluid passageway of the yoke to provide fluid communication between the first pressure chamber and the atmosphere to provide venting for the first pressure chamber. Control fluid is supplied to the second pressure chamber via the second internal fluid passageway of the yoke.

Figure 1B:
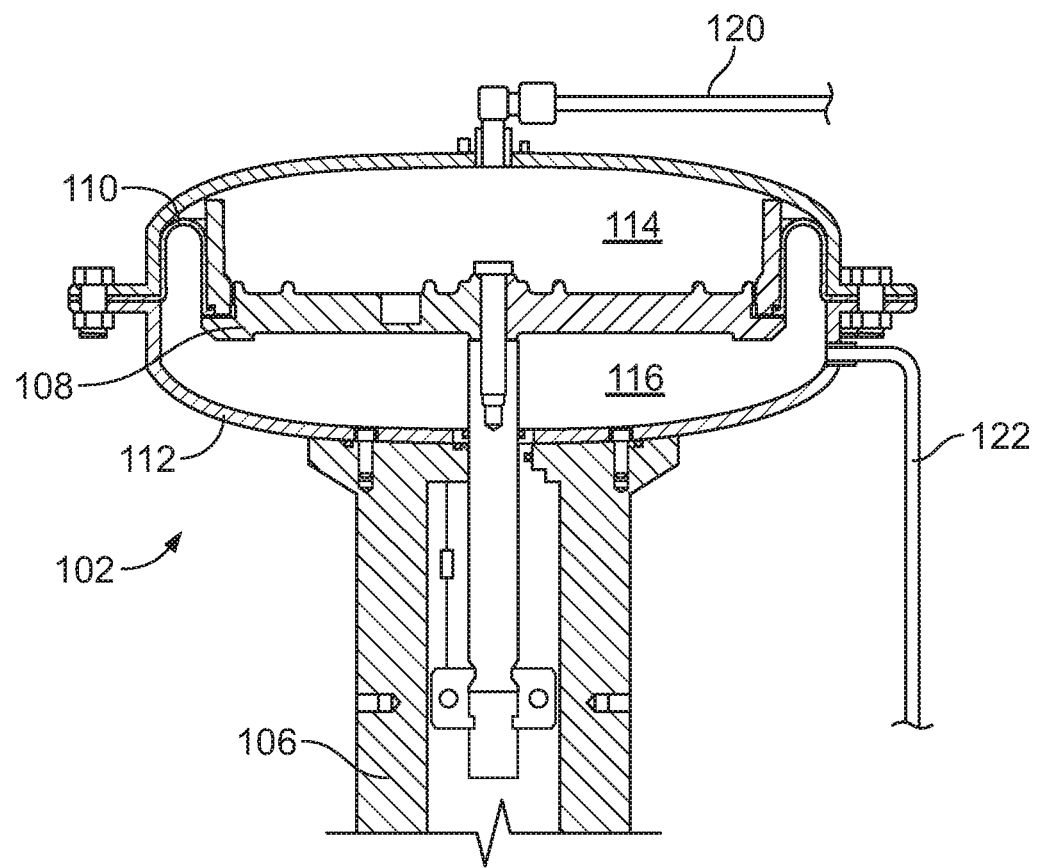
FIG. 1B illustrates a partial cross-sectional view of an actuator and yoke of the known fluid control valve of FIG. 1A.

Before describing the example actuator apparatus as mentioned above, a brief description of a known fluid control valve assembly is provided in connection with FIGS. 1A and 1B. Referring to FIG. 1A, a known fluid control valve assembly 100 is shown. The fluid control valve assembly 100 includes an actuator 102 coupled to a fluid valve 104 via a yoke 106.

FIG. 1B illustrates a cross-sectional view of the actuator 102 and a portion of the yoke 106 of FIG. 1A. The actuator 102 includes a diaphragm plate 108 and a diaphragm 110 disposed in an actuator casing 112 to define a first (e.g., upper in the orientation shown) pressure chamber 114 and second (e.g., lower in the orientation shown) pressure chamber 116. A controller (e.g., positioner) 118 (FIG. 1A) provides a control fluid (e.g., air) to the first and/or second pressure chambers 114 and/or 116 via external tubing 120 and/or 122.

The external tubing 120 and/or 122, however, poses challenges for manufacturing and reliability. When tubing is purchased in bulk, it typically comes in straight lengths. To prepare the tubing for assembly with a valve actuator, the tubing must be cut and bent to shape. In addition, the ends of the tubing must be flared and fittings attached thereto. Specialized tools and fixtures are often required for these processes. Furthermore, material selection of external tubing and fittings is often dictated by their intended operative environment. For example, certain operative environments (e.g., highly corrosive environments) may require the external tubing and fittings to be made of particular expensive materials, such as stainless steel, copper or Monel™, for example.

Figure 2:
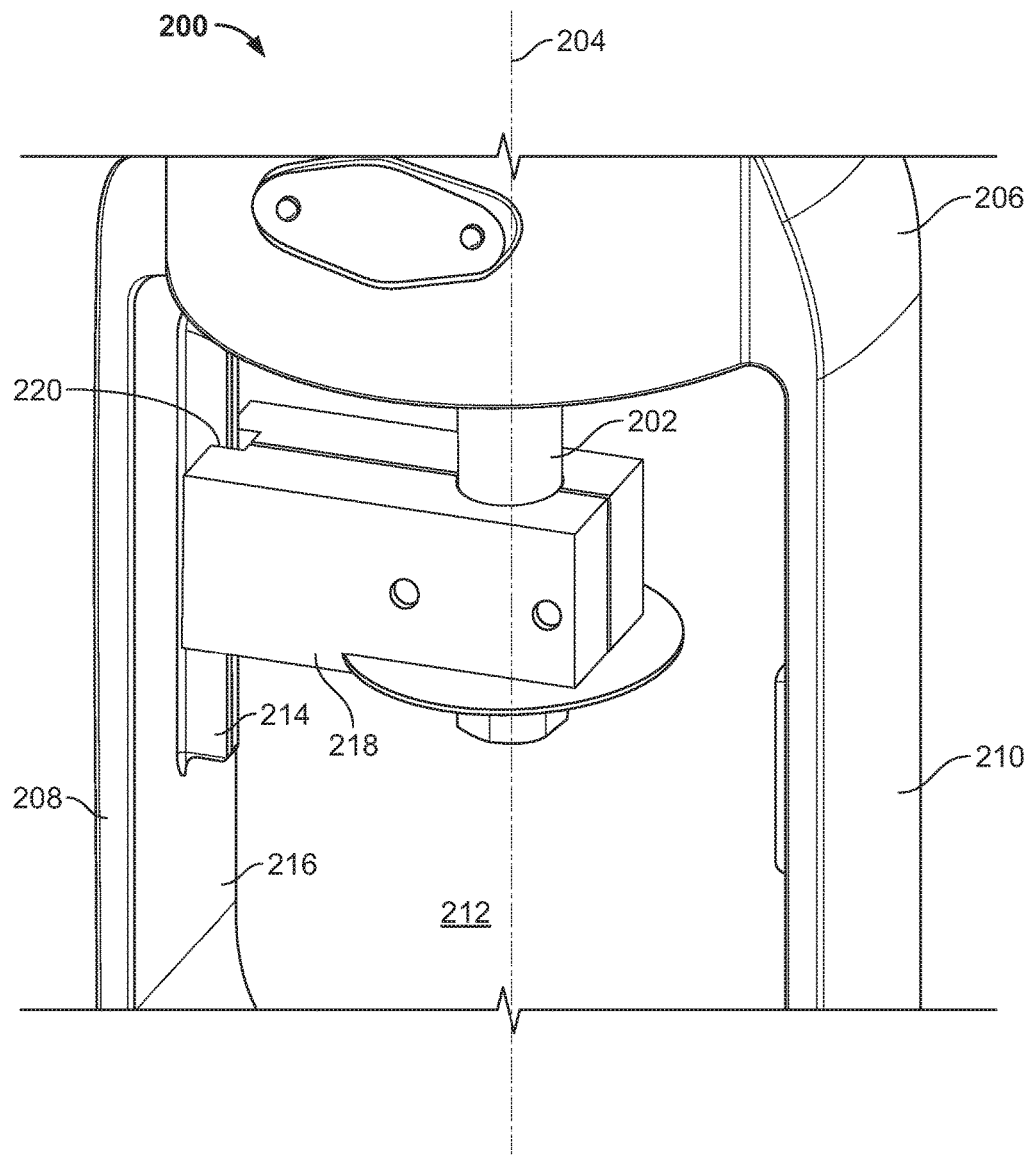
FIG. 2 illustrates a known actuator apparatus with an anti-rotation feature.

Turning now to FIG. 2, a known anti-rotation yoke assembly 200 is illustrated. In certain examples, fluid and/or media flowing through a valve body of a fluid valve can impart torsional forces on valve components, thereby causing a flow control member and/or a valve stem to twist or turn relative to the valve body. Such twisting or turning can damage valve components such as seals. In addition, such twisting or turning can cause measurement inaccuracies for certain types of valve controllers, such as those that utilize non-contact travel feedback.

The anti-rotation yoke assembly 200 couples an actuator (not shown) to a valve body (not shown). An actuator stem 202 extends through a central axis 204 of the yoke assembly 200. The yoke assembly 200 includes a first end 206 and a second end (not shown) opposite the first end 206. A first arm 208 and a second arm 210 spaced from the first arm 208 extend from the first end 206 to the second end to define an open inner portion 212. A guide rail 214 extends from an inner face 216 of the first arm 208 into the open inner portion 212. A stem connector 218 is fixably coupled to the actuator stem 202 and includes a channel 220 slidably coupled to the guide rail 214. More specifically, the guide rail 214 and the channel 220 allow the stem connector 218, and therefore the actuator stem 202, to slide along the central axis 204 of the yoke assembly 200, while preventing the actuator stem 202 from rotating with respect to the central axis 204 of the yoke assembly 200.

The anti-rotation yoke assembly 200 is typically exposed to the external environment. Therefore, various types of debris can become lodged between the guide rail 214 and the channel 220 of the stem connector 218, thereby causing increased friction or binding therebetween. Furthermore, other objects can be pinched between the guide rail 214 and the channel 220 of the stem connector 218. Thus, for at least these reasons, it is desirable for anti-rotation features to be within an enclosure rather than exposed to the external environment.

Figures 3A, 3B:
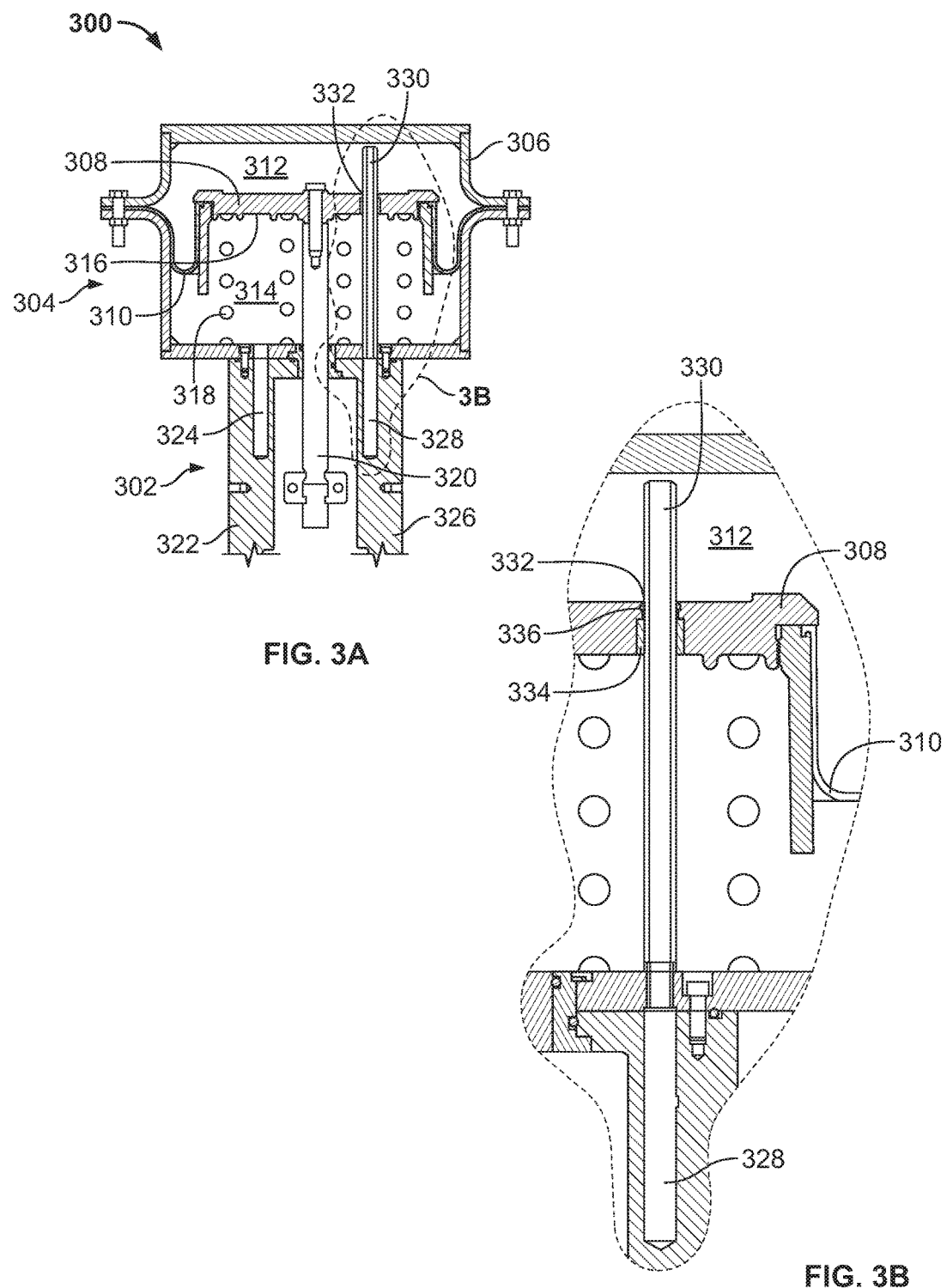
FIG. 3A illustrates an example direct-acting actuator apparatus with internal tubing and an anti-rotation mechanism.
FIG. 3B illustrates a detail view of the example direct-acting actuator apparatus of FIG. 3A.

Turning now to FIGS. 3A and 3B, an example actuator apparatus 300 with internal tubing and an anti-rotation mechanism is illustrated in accordance with the present disclosure. Turning to FIG. 3A, the example actuator apparatus 300 includes a yoke 302 to couple an actuator 304 to a fluid valve (e.g., the fluid valve 104 of FIG. 1A). The actuator 304 includes an actuator casing 306 and a load apparatus comprising a diaphragm plate 308 and a diaphragm 310 positioned in the actuator casing 306 to define a first (e.g., upper) pressure chamber 312 and a second (e.g., lower) pressure chamber 314 opposite the first pressure chamber 312. The diaphragm plate 308 defines a spring seating surface 316 for one or more springs 318. An actuator stem 320 is fixably coupled to the diaphragm plate 308 such that movement of the diaphragm 310 and the diaphragm plate 308 causes movement of the actuator stem 320 and, therefore, of a valve stem (not shown) fixably coupled to the actuator stem 320.

The example actuator apparatus 300 is a direct-acting (e.g., air-to-close) actuator. For direct-acting actuators, control fluid is supplied to the first pressure chamber 312 and the second pressure chamber 314 vents to the atmosphere. Applying control fluid to the first pressure chamber 312 extends the actuator stem 320 out of the actuator casing 306. When the pressure of the control fluid is reduced, the opposing spring force from the spring 318 retracts the actuator stem 320 into the actuator casing 306. Should the control fluid pressure fail, the spring 318 forces the actuator stem 320 and, therefore, the valve stem (not shown) and flow control member (not shown) attached thereto to the extreme retracted (e.g., upwards in the orientation shown) position. This action may be used to provide fail-to-open operation.

The yoke 302 includes a first arm 322 having a first internal fluid passageway 324, and a second arm 326 having a second internal fluid passageway 328. The first internal fluid passageway 324 is in fluid communication with the second pressure chamber 314 and with the atmosphere via a vent (not shown), thereby providing venting for the second pressure chamber 314. A tube 330 is fluidly coupled to the second internal fluid passageway 328 and extends through an opening 332 in the diaphragm plate 308. A controller (e.g., the controller 118 of FIG. 1A) is fluidly coupled to the second internal fluid passageway 328, which is in fluid communication with the first pressure chamber 312 via the tube 330, to provide control fluid to the first pressure chamber 312.

As shown in FIG. 3B, the tube 330 is fluidly coupled to the second internal fluid passageway 328. A controller (not shown) is fluidly coupled to the second internal fluid passageway 328 to provide control fluid to the first pressure chamber 312 via the tube 330. In certain examples, the tube 330 is coupled to the second internal fluid passageway 328 via (1) pipe threads (via, e.g., NPT pipe threads) on the tube 330 and in the second internal fluid passageway 328; (2) welding the tube 330 to the second internal fluid passageway 328; (3) connectors; or (4) any other suitable coupling techniques. As shown in FIG. 3B, the tube 330 extends through the opening 332 in the diaphragm plate 308 to provide fluid communication between the first pressure chamber 312 and the second internal fluid passageway 328. Since the tube 330 is completely internal to the actuator apparatus 300, the tube 330 is not exposed to the harsh environmental conditions to which external tubing is often exposed. Accordingly, the tube 330 need not be constructed of expensive, anti-corrosive materials. In certain examples, the tube 330 is constructed of steel (e.g., galvanized or stainless steel), copper, polymers (e.g., PVC or ABS), or other materials. Moreover, a single size tube can be used in each of the configurations.

The opening 332 in the diaphragm plate 308 includes a bushing 334 and a seal 336, each of which is coaxial to the opening 332 and the tube 330. The bushing 334 has an inside diameter that is slightly larger than an outside diameter of the tube 330. The bushing 334 facilitates axial movement (e.g., sliding) of the diaphragm plate 308 relative to the tube 330. The tube 330 also acts to maintain the alignment of such axial movement during operation. Therefore, the tube 330 provides an anti-rotation mechanism by preventing the diaphragm plate 308 from rotating relative to the actuator casing 306. In certain examples, the bushing 334 comprises a polymer (e.g., nylon) and/or other types of low friction and/or self-lubricating materials. In other examples, the bushing 334 is eliminated by constructing the diaphragm plate 308 and/or the tube 330 of certain materials, such as Nitronic 60, which exhibits resistance to wear and galling.

The seal 336 is disposed within the opening 332 near the first pressure chamber 312 (e.g., adjacent a pressurized side of the diaphragm plate 308). The seal prevents control fluid from leaking from the first pressure chamber 312 into the second pressure chamber 314 via the opening 332. In certain examples, the seal 336 is an o-ring or gasket.

Figure 4A:
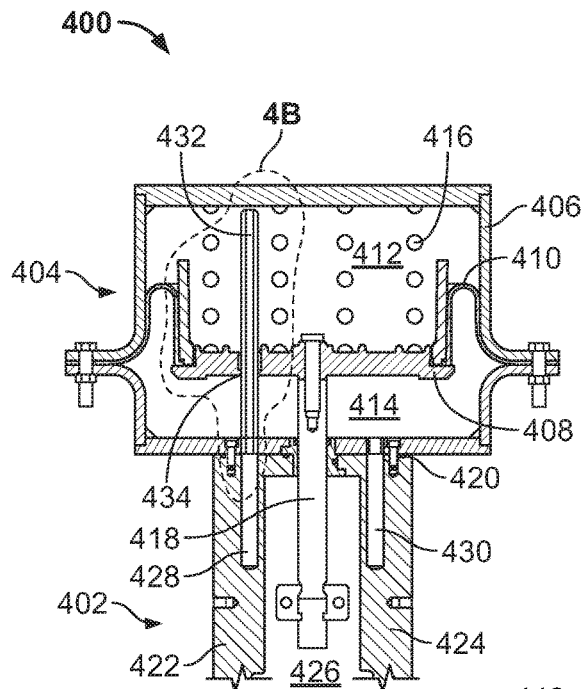
FIG. 4A illustrates an example reverse-acting actuator apparatus with internal tubing and an anti-rotation mechanism.
Figure 4B:
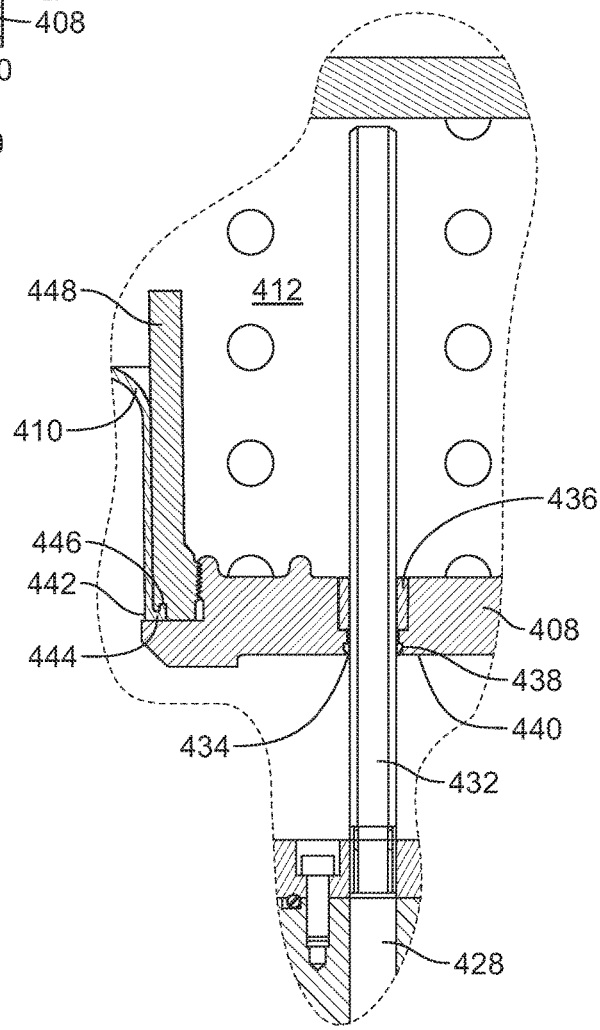
FIG. 4B illustrates a detail view of the example reverse-acting actuator apparatus of FIG. 4A.

Turning now to FIGS. 4A and 4B, another example actuator apparatus 400 with internal tubing and an anti-rotation mechanism is illustrated in accordance with the present disclosure. Turning to FIG. 4A, the example actuator apparatus 400 is a reverse-acting (e.g., air-to-open) actuator, as opposed to the direct-acting actuator apparatus 300 of FIG. 3. The actuator apparatus 400 of FIG. 4A utilizes many of the same components as the actuator apparatus 300 of FIG. 3A. In certain examples, the actuator apparatus 400 of FIG. 4A utilizes the same components as the actuator apparatus 300 of FIG. 3A. Thus, in certain examples, the actuator apparatus 400 is configurable or field reversible such that rearranging the components of the reverse-acting actuator apparatus 400 produces the direct-acting actuator apparatus 300 of FIG. 3A without requiring additional parts. Thus, the actuator apparatus 400 provides additional functionality to users compared to known actuators that are not field-reversible.

Manufacturing operations incur cost for each unique component part. Reducing the number of unique components by combining multiple configurations into a single Stock Keeping Unit (SKU) reduces inventory carrying costs and simplifies inventory management processes. Eliminating redundant parts reduces inventory complexity and simplifies part number management and BOM (Bill of Materials) tracking. A reduction in the number of unique physical items reduces storage space requirements and eliminates manufacturing errors due to common build processes. A smaller subset of components to manage reduces support costs and allows for additional focus on just-in-time or other enhanced inventory planning methodologies.

Simplifying unique direct-acting and reverse-acting actuators into a single SKU reduces fixed support costs and improves operating efficiency. A single configuration directly reduces the spare part inventory required and decreases the opportunity for extended downtime due to out-of-inventory spare parts. In addition, the use of a single SKU streamlines training required by repair technicians and reduces the opportunity for repair defects due to standard repair processes and spare part kits. A successful repair on the first attempt minimizes downtime and can increase safety by eliminating repetitive trips to parts of a process plant.

The example actuator apparatus 400 of FIG. 4 includes many, if not all of the same components of the actuator apparatus 300 of FIG. 3A. The example actuator apparatus 400 includes a yoke 402 to couple an actuator 404 to a fluid valve (e.g., the fluid valve 104 of FIG. 1A). The actuator 404 includes an actuator casing 406 and a load apparatus comprising a diaphragm plate 408 and a diaphragm 410 positioned in the actuator casing 406 to define a first (e.g., upper) pressure chamber 412 and a second (e.g., lower) pressure chamber 414 opposite the first pressure chamber 412. The diaphragm plate 408 defines a spring seating surface for one or more springs 416. An actuator stem 418 is fixably coupled to the diaphragm plate 408 such that movement of the diaphragm 410 and the diaphragm plate 408 causes movement of the actuator stem 418 and, therefore, of a valve stem (not shown) fixably coupled to the actuator stem 418.

As mentioned above, the example actuator apparatus 400 is a reverse-acting (e.g., air-to-open) actuator. For reverse-acting actuators, control fluid is supplied to the second pressure chamber 414 and the first pressure chamber 412 vents to the atmosphere. Applying control fluid to the second pressure chamber 414 retracts the actuator stem 418 into the actuator casing 406. When the pressure of the control fluid is reduced, the opposing spring force from the spring 416 extends the actuator stem 418 out of the actuator casing 406. Should the control fluid pressure fail, the spring 416 forces the actuator stem 418 and, therefore, the valve stem (not shown) and flow control member (not shown) attached thereto to the extreme downward position. This provides fail-to-close operation.

The yoke 402 includes a first end 420 and a second end (not shown) opposite the first end 420. A first arm 422 and a second arm 424 spaced from the first arm 422 extend from the first end 420 to the second end to define an open inner portion 426. A first internal fluid passageway 428 is disposed in the first arm 422 and a second internal fluid passageway 430 is disposed in the second arm 424. A tube 432 is fluidly coupled to the first internal fluid passageway 428, which is in fluid communication with the atmosphere via a vent (not shown). The tube 432 extends through an opening 434 in the diaphragm plate 408 to provide fluid communication between the first pressure chamber 412 and the atmosphere. A controller (e.g., the controller 118 of FIG. 1A) is fluidly coupled to the second internal fluid passageway 430, which is in fluid communication with the second pressure chamber 414, to provide control fluid to the second pressure chamber 414.

As shown in FIG. 4B, the tube 432 extends through the opening 434 in the diaphragm plate 408 to provide fluid communication between the first pressure chamber 412 and the atmosphere. The opening 434 in the diaphragm plate 408 includes a bushing 436 and a seal 438, each of which is coaxial to the opening 434 and the tube 432. The bushing 436 and the seal 438 are similar to or the same as the bushing 334 and the seal 336 of FIG. 3B. The seal 438 is disposed within the opening 434 near the first pressure chamber 412 (e.g., adjacent a pressurized side 440 of the diaphragm plate 408). The seal 438 prevents control fluid from leaking from the first pressure chamber 412 into the second pressure chamber 414 via the opening 434.

The tube 432 also facilitates venting of the first pressure chamber 412 to the atmosphere via the first internal fluid passageway 428 of the yoke 402. Thus, the example actuator apparatus 400 does not require venting through an upper section of the actuator casing 406. Such vents are directly exposed to harsh environmental conditions (e.g., rain) and, thus, are prone to leaking. By venting through the first internal fluid passageway 428 of the yoke 402, which is less exposed to external environmental conditions, less robust and/or less expensive vents may be utilized. In other examples, vents can be eliminated. Thus, the example actuator apparatus 400 provides improved reliability at a reduced cost compared to known actuators.

The diaphragm 410 of FIGS. 4A and 4B is circular in shape and has a central aperture. An inner portion 442 of the diaphragm 410 includes a hook-shaped feature or lip 444 that is captured between the diaphragm plate 408 and a complimentary hook-shaped feature or lip 446 of a retainer ring 448 of the diaphragm plate 408. The diaphragm 410 of FIGS. 4A and 4B is similar to the diaphragm 310 of FIGS. 3A and 3B.

Figures 5A, 5B:
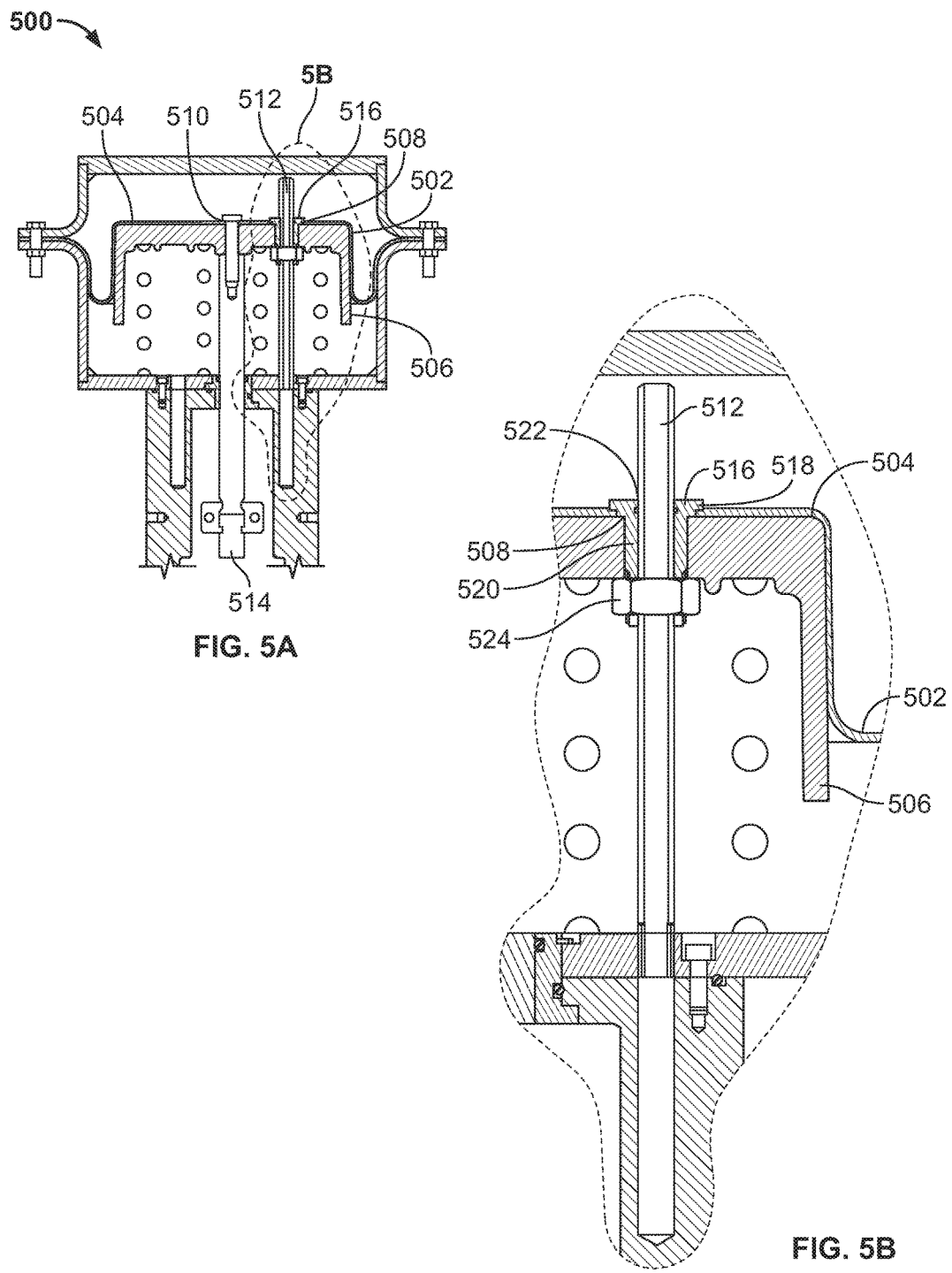
FIG. 5A illustrates an example direct-acting actuator apparatus with internal tubing, an anti-rotation mechanism and a unitary diaphragm plate.
FIG. 5B illustrates a detail view of the example direct-acting actuator apparatus of FIG. 5A.

Turning now to FIGS. 5A and 5B, another example actuator apparatus 500 is illustrated. The example actuator apparatus 500 is a direct-acting (e.g., air-to-close) actuator. The example actuator apparatus 500 includes a diaphragm 502 that extends across a pressurized face 504 of a diaphragm plate 506. The diaphragm 502 and the diaphragm plate 506 include openings 508 and 510 to accommodate a tube 512 and an actuator shaft 514, respectively. A flanged bushing 516 retains the diaphragm 502 against the pressurized face 504 of the diaphragm plate 506. In this configuration, a unitary diaphragm plate 506 is implemented, as opposed to the two-piece diaphragm plate 408 including the retainer ring 448 that is employed in the actuator apparatus 300 and 400 of FIGS. 3A-4B.

Turning now to FIG. 5B, the flanged bushing 516 is described in further detail. The flanged bushing 516 is coaxial to the tube 512 and the opening 508 in the diaphragm 502 and the diaphragm plate 506. The flanged bushing 516 includes a flange portion 518 to retain the diaphragm 502 against the diaphragm plate 506, and a sleeve portion 520 to facilitate axial movement (e.g., sliding) of the diaphragm plate 506 relative to the tube 512. In certain examples, the flanged bushing 516 includes a seal 522 (e.g., an o-ring or gasket) to prevent control fluid from leaking along the tube 512. A retainer or fastener 524 is threadably coupled to the flanged bushing 516 on a side of the diaphragm plate 506 opposite the diaphragm 502. In certain examples, the retainer 524 is a nut. Tightening the retainer 524 compresses the diaphragm 502 between the diaphragm plate 506 and the flange portion 518 of the flanged bushing 516, thereby retaining the diaphragm 502 against the diaphragm plate 506.

Figure 6A:
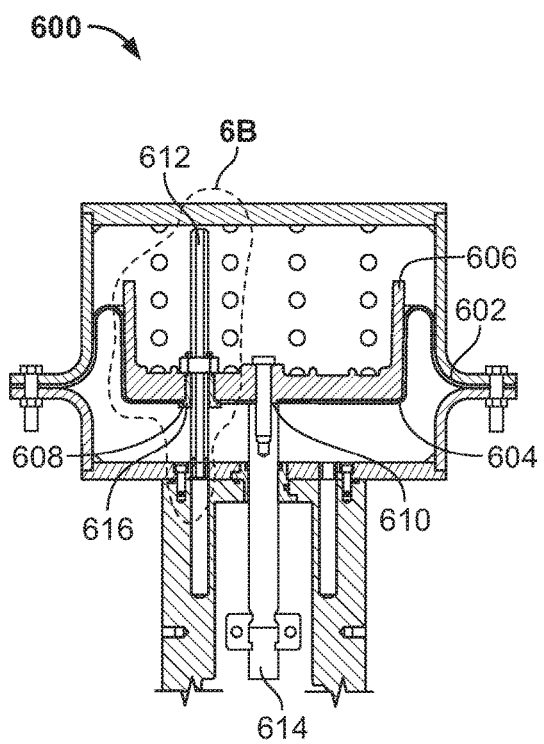
FIG. 6A illustrates an example reverse-acting actuator apparatus with internal tubing, an anti-rotation mechanism and a unitary diaphragm plate.
Figure 6B:
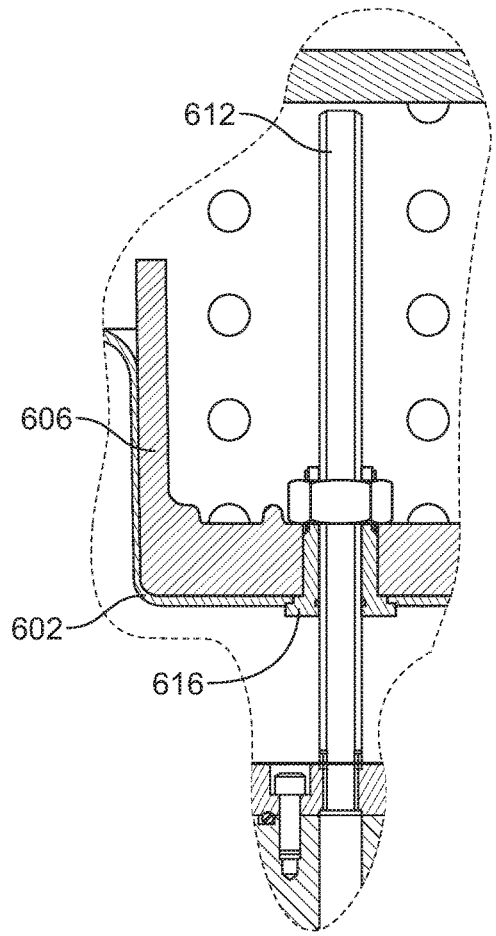
FIG. 6B illustrates a detail view of the example reverse-acting actuator apparatus of FIG. 6A.

Turning now to FIGS. 6A and 6B, another example actuator apparatus 600 is illustrated. The example actuator apparatus 600 is a reverse-acting (e.g., air-to-open) actuator, whereas the example actuator apparatus 500 of FIGS. 5A and 5B is a direct-acting (e.g., air-to-close) actuator. Similar to the example actuator apparatus 500 of FIGS. 5A and 5B, the example actuator apparatus 600 includes a diaphragm 602 that extends across a pressurized face 604 of a diaphragm plate 606. The diaphragm 602 includes openings 608 and 610 to accommodate a tube 612 and an actuator shaft 614, respectively. A flanged bushing 616 retains the diaphragm 602 against the pressurized face 604 of the diaphragm plate 606.

Turning now to FIGS. 7-12, further example actuator apparatus with various bench set configurations are illustrated. The example actuator apparatus 700, 800, 900, 1000, 1100 and 1200 may include internal fluid passageways (e.g., the internal fluid passageways 324, 328, 428, 430 of FIGS. 3A-4B) and a tube or tubing (e.g., the tube 330, 432, 512, 612 of FIGS. 3A-6B). The example actuator apparatus 700, 800 and 900 are direct-acting (e.g., air-to-close) actuators, whereas the example actuator apparatus 1000, 1100 and 1200 are reverse-acting (e.g., air-to-open) actuators. Bench set refers to an initial compression placed on an actuator spring with a spring adjuster. For air-to-open valves, a lower bench set determines the amount of seat load force available and the pressure required to begin valve-opening travel. For air-to-close valves, the lower bench set determines the pressure required to begin valve-closing travel.

The example actuator apparatus 700 of FIG. 7 is a direct-acting actuator with a non-adjustable bench set.

The example actuator apparatus 800 of FIG. 8 is a direct-acting actuator with an adjustable bench set. The example actuator apparatus 800 includes a spring adjuster 802 threadably coupled to an actuator casing 804. The spring adjuster 802 further includes a spring seat 806, which abuts the one or more springs 808. Bench set is adjusted by rotating the spring adjuster 802 relative to the actuator casing 804, which changes the compression of the spring 808.

The example actuator apparatus 900 of FIG. 9 is a direct-acting actuator with an adjustable bench set and a double diaphragm. The example actuator apparatus 900 includes a spring adjuster 902 threadably coupled to an actuator casing 904. The spring adjuster 902 further includes a spring seat 906, which abuts the one or more springs 908. Bench set is adjusted by rotating the spring adjuster 902 relative to the actuator casing 904, which changes the compression of the spring 908. The example actuator apparatus 900 further includes first and second diaphragms 910, 912. Double diaphragm actuators, such as the example actuator apparatus 900, provide improved control precision, decreased operational friction, and increased diaphragm force, as compared to single diaphragm actuators.

Figure 10:
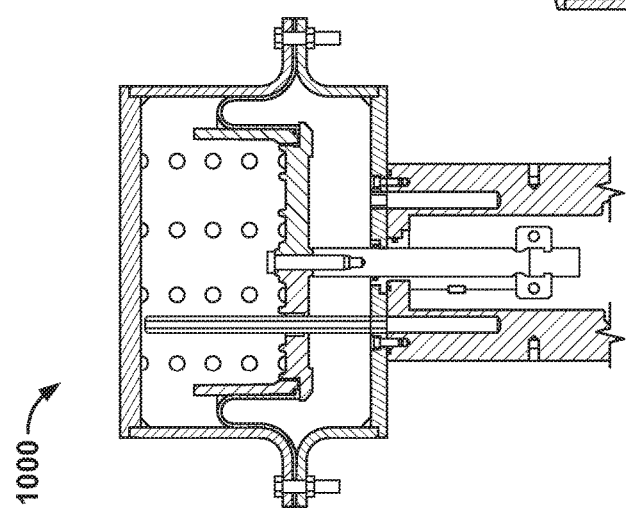
FIG. 10 illustrates an example reverse-acting actuator apparatus having a non-adjustable bench set.

The example actuator apparatus 1000 of FIG. 10 is a reverse-acting actuator with a non-adjustable bench set.

Figure 11:
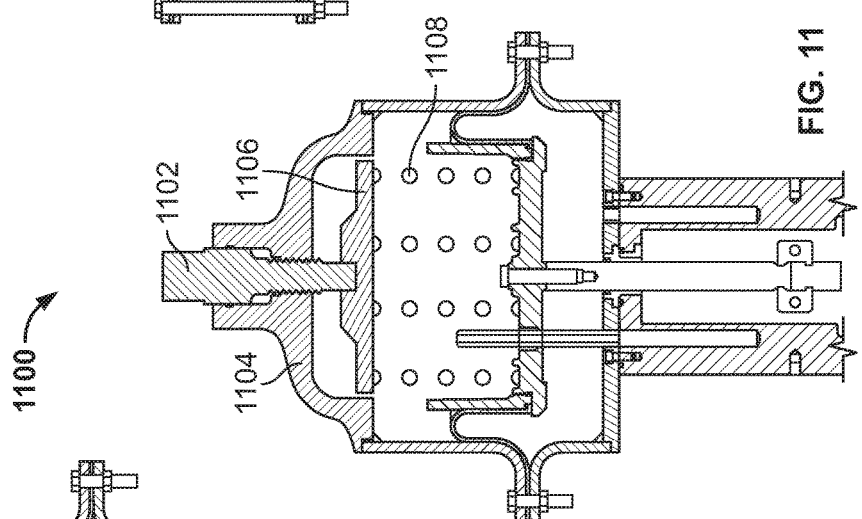
FIG. 11 illustrates an example reverse-acting actuator apparatus having an adjustable bench set.

The example actuator apparatus 1100 of FIG. 11 is a reverse-acting actuator with an adjustable bench set. The example actuator apparatus 1100 includes a spring adjuster 1102 threadably coupled to an actuator casing 1104. The spring adjuster 1102 is further coupled to a spring seat 1106, which abuts the one or more springs 1108. Bench set is adjusted by rotating the spring adjuster 1102 relative to the actuator casing 1104, which changes the compression of the spring 1108.

Figure 12:
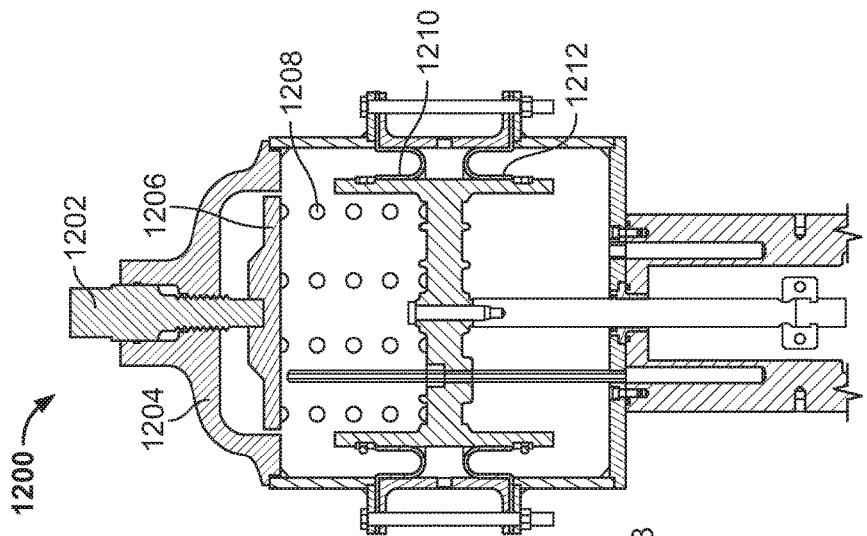
FIG. 12 illustrates an example reverse-acting actuator apparatus having an adjustable bench set and a double diaphragm.

The example actuator apparatus 1200 of FIG. 12 is a reverse-acting actuator with an adjustable bench set and a double diaphragm. The example actuator apparatus 1200 includes a spring adjuster 1202 threadably coupled to an actuator casing 1204. The spring adjuster 1202 is further coupled to a spring seat 1206, which abuts the one or more springs 1208. Bench set is adjusted by rotating the spring adjuster 1202 relative to the actuator casing 1204, which changes the compression of the spring(s) 1208. The example actuator apparatus 1200 further includes first and second diaphragms 1210, 1212. Double diaphragm actuators, such as the example actuator apparatus 1200, provide improved control precision, decreased operational friction, and increased diaphragm force, as compared to single diaphragm actuators.

Although certain example apparatus have been described herein, the scope of coverage of this patent is not limited thereto. On the contrary, this patent covers all methods, apparatus and articles of manufacture fairly falling within the scope of the amended claims either literally or under doctrine of equivalents.

The invention claimed is:
1. An apparatus comprising:
a diaphragm plate defining a first pressure chamber and a second pressure chamber opposite the first pressure chamber;
a first internal fluid passageway in fluid communication with atmosphere;
a second internal fluid passageway to receive a control fluid from a controller;
a tube fluidly coupling the first or second internal fluid passageway to the first pressure chamber via an opening in the diaphragm plate, a first center axis of the tube offset from a second center axis of the diaphragm plate, the tube passing through the diaphragm plate to prevent the diaphragm plate from rotating;
an adjustable spring seat in contact with a spring at a first end of the spring, the spring in contact with the diaphragm plate at a second end of the spring opposite the first end; and
a seal to seal an interface between the tube and the opening in the diaphragm plate on a side of the diaphragm plate to be pressurized, wherein the side of the diaphragm plate to be pressurized is adjacent the first pressure chamber in a direct-acting configuration and adjacent the second pressure chamber in a reverse-acting configuration.

2. The apparatus as defined in claim 1, further including an adjuster that is threadably coupled to a valve body, the adjuster operatively coupled to the adjustable spring seat or the diaphragm plate.

3. The apparatus as defined in claim 1, wherein the apparatus is alternatively configurable for direct-acting operation or reverse-acting operation.

4. The apparatus as defined in claim 1, wherein,
in a direct-acting configuration, the tube is fluidly coupled to the second internal fluid passageway to supply the control fluid to the first pressure chamber, and the second pressure chamber is in fluid communication with atmosphere via the first internal fluid passageway; and
in a reverse-acting configuration, the tube is fluidly coupled to the first internal fluid passageway to provide fluid communication between the first pressure chamber and the atmosphere, and the control fluid is supplied to the second pressure chamber via the second internal fluid passageway.

5. The apparatus as defined in claim 1, further comprising a bushing fixed in the opening in the diaphragm plate, the bushing having an inner surface to slidably receive the tube.

6. The apparatus as defined in claim 5, wherein the seal is integrated with the bushing.

7. The apparatus as defined in claim 5, wherein the diaphragm plate is a unitary member and wherein a diaphragm extends across a face of the diaphragm plate adjacent the pressurized side of the diaphragm plate.

8. The apparatus as defined in claim 5, wherein the bushing includes a flange to retain a diaphragm.

9. The apparatus as defined in claim 8, further comprising a retainer adjacent a face of the diaphragm plate opposite the side of the diaphragm plate to be pressurized, the retainer threadably coupled to the bushing to retain the diaphragm between the flange of the bushing and a face of the diaphragm plate adjacent the side of the diaphragm plate to be pressurized.

10. An apparatus, comprising:
means for actuating a fluid valve;
means for attaching the means for actuating to the fluid valve;
first means for fluidly coupling a first pressure chamber to atmosphere, a portion of the first means for fluidly coupling being integrally formed with the means for attaching; and
second means for fluidly coupling a second pressure chamber to a control fluid without the use of external tubing, a portion of the second means for fluidly coupling being integrally formed with the means for attaching, wherein the first or second means for fluidly coupling further includes means for preventing a valve stem of the fluid valve from rotating relative to the fluid valve, wherein the means for preventing the valve stem of the fluid valve from rotating is offset from a central axis of the valve stem;
means for adjusting an amount of force acting on the actuating means; and
means for sealing the means for preventing to prevent leakage between the first and second pressure chambers.

11. The apparatus as defined in claim 10, wherein:
in a direct-acting configuration, the second means for fluidly coupling includes the means for preventing; and
in a reverse-acting configuration, the first means for fluidly coupling includes the means for preventing.

12. An apparatus comprising:
an actuator casing;
a diaphragm plate disposed within the actuator casing and defining a first pressure chamber and a second pressure chamber opposite the first pressure chamber;
a yoke to couple the actuator casing to a fluid valve, the yoke including a first internal fluid passageway in fluid communication with atmosphere and a second internal fluid passageway to receive a control fluid from a controller;
a tube fluidly coupling the first or second internal fluid passageway to the first pressure chamber via an opening in the diaphragm plate, a first center axis of the tube offset from a second center axis of the diaphragm plate, the tube passing through the diaphragm plate to prevent the diaphragm plate from rotating relative to the actuator casing; and
an adjustable spring seat in contact with a spring at a first end of the spring, the spring in contact with the diaphragm plate at a second end of the spring opposite the first end.

13. The apparatus as defined in claim 12, further including an adjuster that is threadably coupled to a valve body, the adjuster operatively coupled to the adjustable spring seat or the diaphragm plate.

14. The apparatus as defined in claim 12, wherein the apparatus is alternatively configurable for direct-acting operation or reverse-acting operation.

15. The apparatus as defined in claim 12, wherein,
in a direct-acting configuration, the tube is fluidly coupled to the second internal fluid passageway to supply the control fluid to the first pressure chamber, and the second pressure chamber is in fluid communication with atmosphere via the first internal fluid passageway; and
in a reverse-acting configuration, the tube is fluidly coupled to the first internal fluid passageway to provide fluid communication between the first pressure chamber and the atmosphere, and the control fluid is supplied to the second pressure chamber via the second internal fluid passageway.

16. The apparatus as defined in claim 12, further comprising a seal to seal an interface between the tube and the opening in the diaphragm plate on a pressurized side of the diaphragm plate, wherein the pressurized side of the diaphragm plate is adjacent the first pressure chamber in a direct-acting configuration and adjacent the second pressure chamber in a reverse-acting configuration.

17. The apparatus as defined in claim 16, further comprising a bushing fixed in the opening in the diaphragm plate, the bushing having an inner surface to slidably receive the tube.

18. The apparatus as defined in claim 17, wherein the seal is integrated with the bushing.

19. The apparatus as defined in claim 17, wherein the diaphragm plate is a unitary member and wherein a diaphragm extends across a face of the diaphragm plate adjacent the pressurized side of the diaphragm plate.

20. The apparatus as defined in claim 17, wherein the bushing includes a flange to retain a diaphragm.

21. The apparatus as defined in claim 20, further comprising a retainer adjacent a face of the diaphragm plate opposite the pressurized side of the diaphragm plate, the retainer threadably coupled to the bushing to retain the diaphragm between the flange of the bushing and a face of the diaphragm plate adjacent the pressurized side of the diaphragm plate.

* * * * *